US 011773879B2

(12) United States Patent
Takakuwa et al.

(10) Patent No.: US 11,773,879 B2
(45) Date of Patent: Oct. 3, 2023

(54) FLOW RATE CONTROLLER AND DRIVE DEVICE EQUIPPED WITH SAME

(71) Applicant: SMC CORPORATION, Chiyoda-ku (JP)

(72) Inventors: Youji Takakuwa, Kitakatsushika-gun (JP); Akihiro Kazama, Moriya (JP); Hiroyuki Asahara, Tsukuba (JP); Kengo Monden, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/640,237

(22) PCT Filed: Aug. 3, 2020

(86) PCT No.: PCT/JP2020/029600
§ 371 (c)(1),
(2) Date: Mar. 3, 2022

(87) PCT Pub. No.: WO2021/044781
PCT Pub. Date: Mar. 11, 2021

(65) Prior Publication Data
US 2022/0316501 A1 Oct. 6, 2022

(30) Foreign Application Priority Data
Sep. 6, 2019 (JP) ................. 2019-162905

(51) Int. Cl.
F15B 15/22 (2006.01)
F15B 11/06 (2006.01)
(Continued)

(52) U.S. Cl.
CPC .......... F15B 15/22 (2013.01); F15B 11/0413 (2013.01); F15B 11/06 (2013.01);
(Continued)

(58) Field of Classification Search
CPC .... F15B 15/22; F15B 15/204; F15B 11/0413; F15B 11/06; F15B 13/0401
See application file for complete search history.

(56) References Cited

U.S. PATENT DOCUMENTS 3,802,318 A * 4/1974 Sibbald ................... B65B 57/00
91/363 R
5,349,151 A * 9/1994 Eisbrenner ............ F15B 11/022
91/461
(Continued)

FOREIGN PATENT DOCUMENTS

JP 52-21399 U1 2/1977
JP 4-15303 A 1/1992
(Continued)

OTHER PUBLICATIONS

International Search Report dated Oct. 13, 2020 in PCT/JP2020/029600 filed Aug. 3, 2020, citing documents AP-AS therein, 3 pages.

(Continued)

Primary Examiner — Dustin T Nguyen
(74) Attorney, Agent, or Firm — Oblon, McClelland, Maier & Neustadt, L.L.P.

(57) ABSTRACT

In a flow rate controller and a drive device, a housing is provided therein with a first flow passage, a second flow passage adjacent to the first flow passage, a first throttle valve provided to the first flow passage, and a second throttle valve provided to the second flow passage. A pilot check valve is provided to the second flow passage and is connected in series to the second throttle valve. A pilot air flow passage communicates with a pilot port of the pilot check valve for supplying and discharging pilot air, and a third throttle valve is provided to the pilot air flow passage. In response to the pressure of the pilot air, the pilot check valve switches between a state in which the passage of exhaust air (Continued)

discharged from an air cylinder is permitted and a state in which passage of the exhaust air is prevented.

6 Claims, 8 Drawing Sheets

(51) Int. Cl.
*F15B 13/04* (2006.01)
*F15B 13/02* (2006.01)
*F15B 11/04* (2006.01)
*G05D 7/01* (2006.01)
*F15B 15/20* (2006.01)

(52) U.S. Cl.
CPC ........ *F15B 13/027* (2013.01); *F15B 13/0401* (2013.01); *F15B 15/204* (2013.01); *F15B 2211/30505* (2013.01); *F15B 2211/40515* (2013.01); *F15B 2211/40584* (2013.01); *F15B 2211/40592* (2013.01); *F15B 2211/41527* (2013.01); *F15B 2211/473* (2013.01); *F15B 2211/6355* (2013.01); *F15B 2211/67* (2013.01); *F15B 2211/7053* (2013.01); *F15B 2211/75* (2013.01); *F15B 2211/8855* (2013.01); *G05D 7/014* (2013.01)

(56) References Cited

U.S. PATENT DOCUMENTS

| | | | |
|---|---|---|---|
| 6,305,264 B1 * | 10/2001 | Yang | F15B 11/042 |
| | | | 91/447 |
| 7,591,133 B2 * | 9/2009 | Wright | F15B 20/002 |
| | | | 60/404 |
| 10,030,677 B2 | 7/2018 | Shishido | |
| 10,514,048 B2 * | 12/2019 | Yamada | F15B 13/042 |
| 2010/0206405 A1 | 8/2010 | McConnell | |

FOREIGN PATENT DOCUMENTS

| | | |
|---|---|---|
| JP | 2009-115242 A | 5/2009 |
| JP | 2014-129853 A | 7/2014 |
| JP | 5578502 B2 | 8/2014 |

OTHER PUBLICATIONS

European Search Report dated Jul. 6, 2023, in corresponding European Patent Application No. 20 86 0590.7, filed Aug. 3, 2020, 8 pages.

* cited by examiner

FLOW RATE CONTROLLER AND DRIVE DEVICE EQUIPPED WITH SAME

TECHNICAL FIELD

The present invention relates to a flow rate controller for an air cylinder, and a drive device equipped with the flow rate controller.

BACKGROUND ART

Conventionally, a shock absorbing mechanism has been used in which a cushioning material made of a soft resin such as rubber or urethane or the like, or an oil damper or the like is attached to an end part of an air cylinder, to thereby cushion an impact at a stroke end. However, such a shock absorbing mechanism that mechanically mitigates shocks in the cylinder is limited in terms of the number of operations it can perform, and requires regular maintenance.

In order to resolve such incompatibility, in JP 5578502 B2, a speed controller (flow rate controller) is disclosed in which, by throttling the exhaust air that is discharged from the air cylinder in the vicinity of a stroke end, an operating speed of the air cylinder is reduced.

SUMMARY OF THE INVENTION

However, such a conventional flow rate controller is formed with a large number of component parts. Further, in the case that a three-way valve is used as a member for switching a throttled state of the exhaust air, a problem arises in that component parts requiring a number of production steps, such as a spool or the like on which grinding or polishing is needed, become necessary, and the flow rate controller cannot be manufactured at a low cost.

The present invention has the object of providing a flow rate controller and a drive device equipped with the flow rate controller, which can simplify the device configuration and can be manufactured easily.

An aspect of the present invention is characterized by a flow rate controller connected between a port of an air cylinder, and an operation switching valve configured to switch and thereby connect a high pressure air supply source or an exhaust port to the air cylinder, the flow rate controller comprising a housing including a cylinder side port connected to a port of the air cylinder, and a valve side port connected to the operation switching valve, a first flow path provided inside the housing, and configured to connect the cylinder side port and the valve side port, a first throttle valve disposed in the first flow path, a second flow path provided inside the housing and disposed in parallel with the first flow path, a second throttle valve disposed in the second flow path, a pilot check valve disposed in the second flow path and connected in series with the second throttle valve, a pilot air flow path provided inside the housing, and configured to connect the valve side port and a pilot port of the pilot check valve to supply and discharge pilot air to and from the pilot check valve, and a third throttle valve disposed in the pilot air flow path, wherein, depending on a pressure of the pilot air, the pilot check valve switches between a state allowing passage of exhaust air discharged from the air cylinder, and a state preventing the passage of the exhaust air.

Another aspect of the present invention is characterized by a drive device for an air cylinder, the drive device comprising a high pressure air supply source configured to supply high pressure air to the air cylinder, an exhaust port configured to discharge exhaust air of the air cylinder, an operation switching valve configured to switch and thereby connect the high pressure air supply source or the exhaust port to a port of the air cylinder, and a flow rate controller connected between the operation switching valve and the port of the air cylinder, wherein the flow rate controller includes a housing including a cylinder side port connected to the port of the air cylinder, and a valve side port connected to the operation switching valve, a first flow path provided inside the housing, and configured to connect the cylinder side port and the valve side port, a first throttle valve disposed in the first flow path, a second flow path provided inside the housing and disposed in parallel with the first flow path, a second throttle valve disposed in the second flow path, a pilot check valve disposed in the second flow path and connected in series with the second throttle valve, a pilot air flow path provided inside the housing, and configured to connect the valve side port and a pilot port of the pilot check valve to supply and discharge pilot air to and from the pilot check valve, and a third throttle valve disposed in the pilot air flow path, and depending on a pressure of the pilot air, the pilot check valve switches between a state allowing passage of the exhaust air, and a state preventing the passage of the exhaust air.

In accordance with the flow rate controller and the drive device comprising the same according to the above-described aspects, the device configuration is simplified, and manufacturing becomes easy to perform.

DESCRIPTION OF THE INVENTION

Hereinafter, a preferred embodiment of the present invention will be presented and described in detail below with reference to the accompanying drawings.

Figure 1:
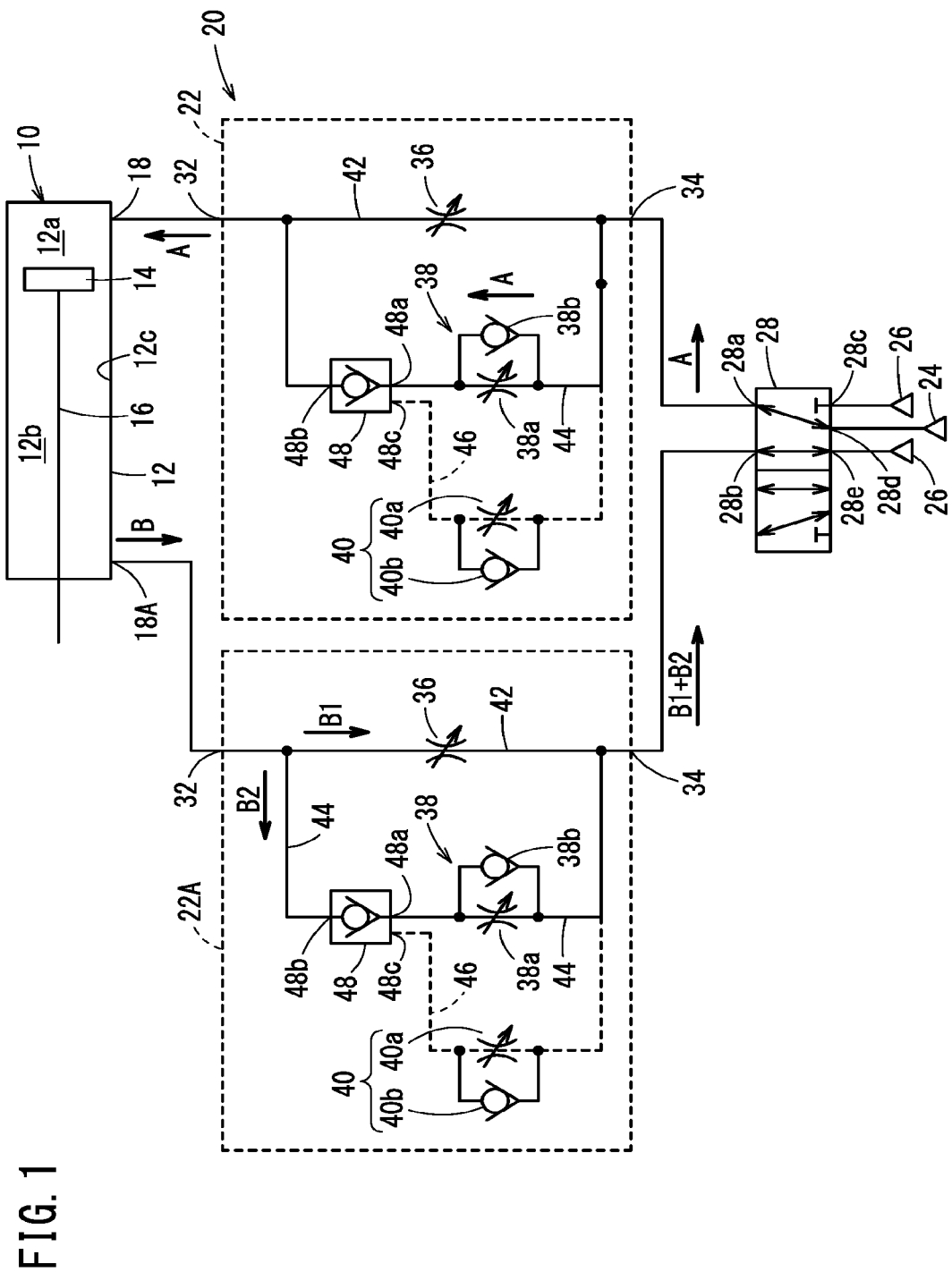
FIG. 1 is a fluid circuit diagram of a flow rate controller and a drive device for an air cylinder according to a first embodiment.

As shown in FIG. 1, an air cylinder 10 is a double acting cylinder that is used in an automated equipment line or the like. The air cylinder 10 is equipped with a cylindrically shaped cylinder tube 12. In the interior of the cylinder tube 12, there are provided a piston 14 that partitions a cylinder chamber 12c, and a piston rod 16 connected to the piston 14. A head side port 18 is provided in a head side pressure chamber 12a, and a rod side port 18A is provided in a rod side pressure chamber 12b.

A drive device 20 is connected to the head side port 18 and the rod side port 18A. The drive device 20 is equipped with a head side flow rate controller 22 connected to the head side port 18, a rod side flow rate controller 22A connected to the rod side port 18A, a high pressure air supply source 24, exhaust ports 26, and an operation switching valve 28.

Figure 2:
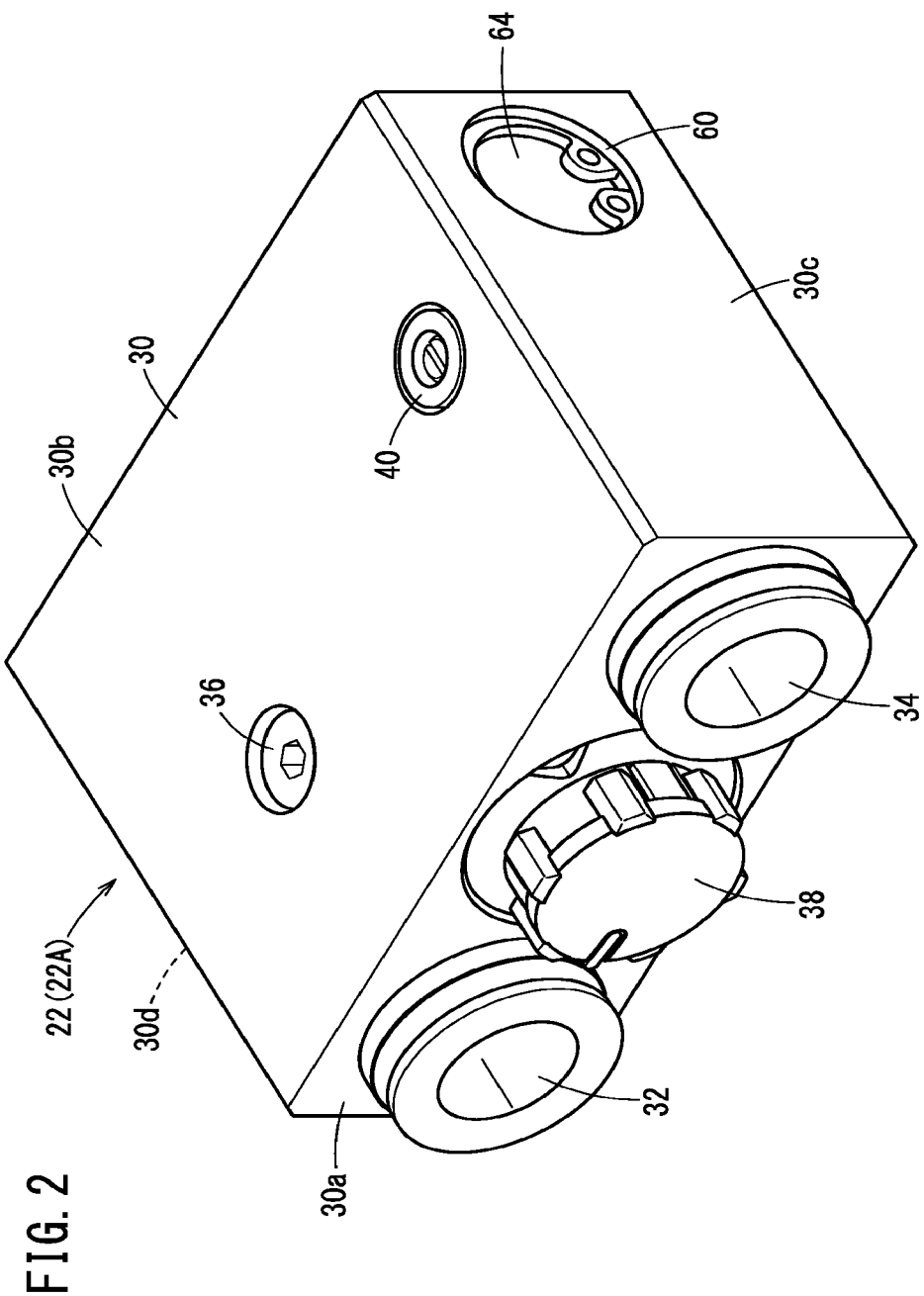
FIG. 2 is a perspective view showing the external appearance of the flow rate controller shown in FIG. 1.

As shown in FIG. 2, the head side flow rate controller 22 has a flat box-shaped housing 30. On a front surface 30a of the housing 30, there are provided a cylinder side port 32 connected to the head side port 18 of the air cylinder 10, a valve side port 34 connected to the operation switching valve 28, and a second throttle valve 38 that sets a stroke speed of the air cylinder 10. Further, on an upper surface 30b of the housing 30, there are provided a first throttle valve 36 for adjusting a degree to which an operating speed of the piston 14 is limited, and a third throttle valve 40 that sets a timing at which regulation of the operating speed of the piston 14 is initiated. A connecting member 32b is provided on the cylinder side port 32, and a connecting member 34b is provided on the valve side port 34.

Figure 3:
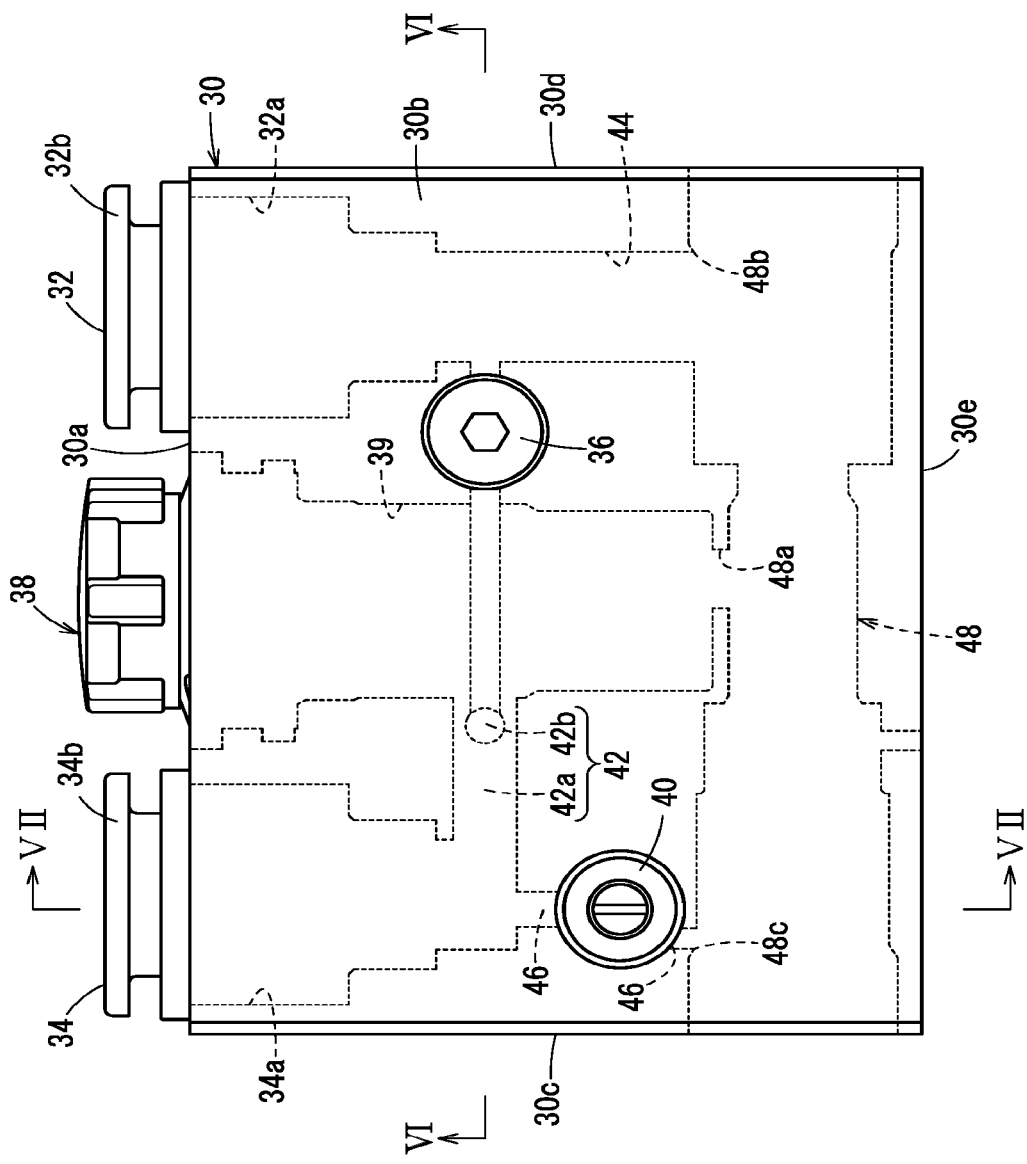
FIG. 3 is a plan perspective view showing the layout of a throttle valve and flow paths of the flow rate controller shown in FIG. 2.

As shown by the dashed lines in FIG. 3, in the interior of the housing 30, there are provided a first flow path 42, a pilot air flow path 46, and a pilot check valve 48. Hereinafter, with reference to the cross-sectional views of FIGS. 4 to 7, a description will be given concerning the internal structure of the housing 30.

Figure 4:
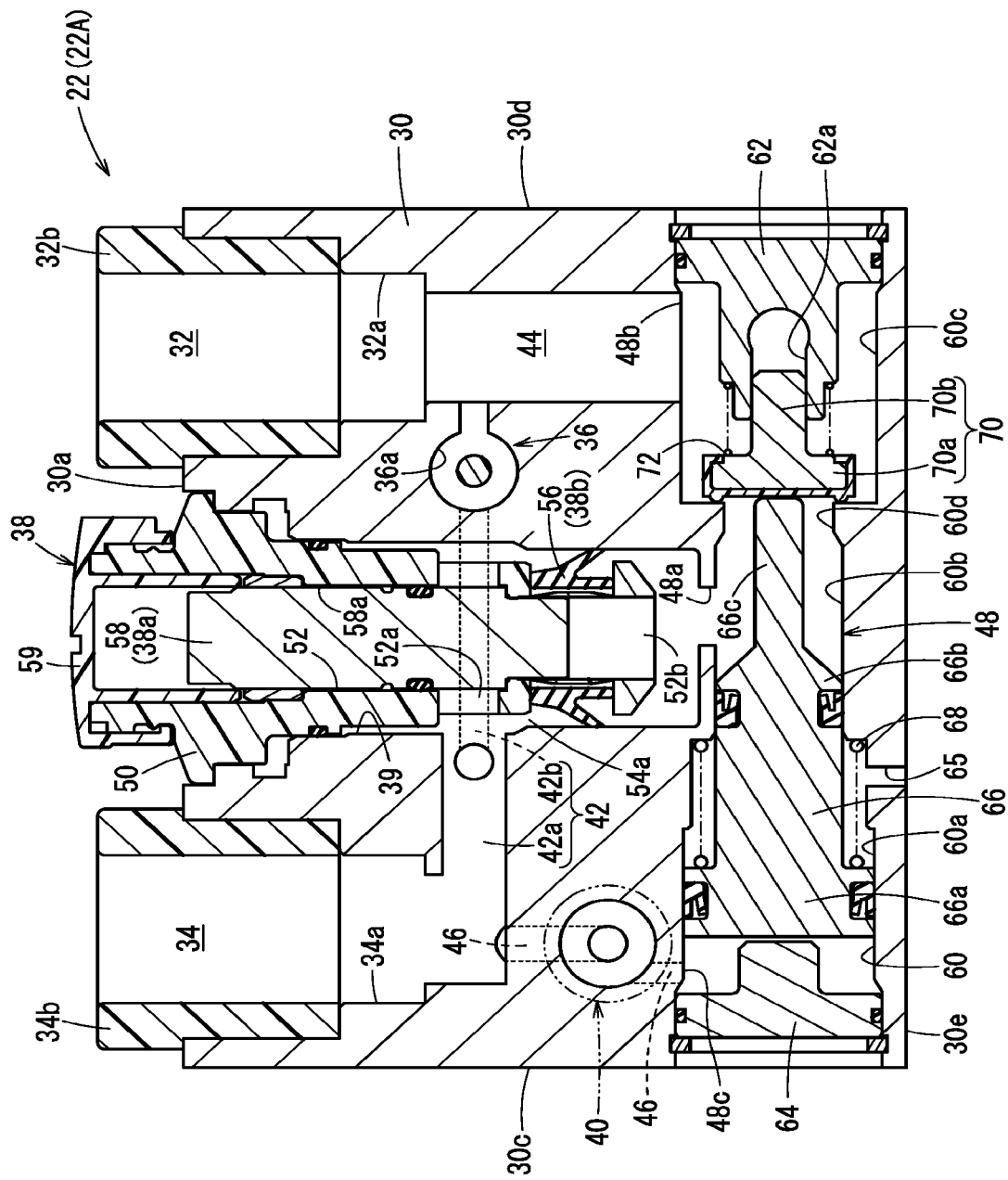
FIG. 4 is a cross-sectional view taken along line IV-IV of FIG. 6.

As shown in FIG. 4, the valve side port 34 is disposed in a port forming hole 34a provided in the vicinity of a first side surface 30c of the housing 30. The port forming hole 34a opens on the front surface 30a of the housing 30, and is formed toward a rear surface 30e. The connecting member 34b, which is provided in order for a pipe to be connected thereto, is mounted on the front surface 30a of the port forming hole 34a. The first flow path 42 and the pilot air flow path 46 open on an end part of the port forming hole 34a on the rear surface 30e side.

As shown in FIG. 1, the first flow path 42 and a second flow path 44 are flow paths that connect the valve side port 34 and the cylinder side port 32, and are arranged in parallel. As shown in FIG. 4, the first flow path 42 includes a first hole portion 42a that extends linearly from the port forming hole 34a toward a second side surface 30d, and a second hole portion 42b that is bent and extends from the first hole portion 42a toward the cylinder side port 32. Further, an end part of the first hole portion 42a on the second side surface 30d side communicates, as a portion of the second flow path 44, with the second throttle valve 38.

The second throttle valve 38 is provided in a valve hole 39 formed between the valve side port 34 and the cylinder side port 32. The valve hole 39 opens on a front surface side of the housing 30, and extends toward the rear surface 30e. The first hole portion 42a opens on a side part of the valve hole 39, and an end part of the valve hole 39 on the rear surface 30e side communicates with an inlet 48a of the pilot check valve 48, as will be discussed later.

The second throttle valve 38 is a check valve equipped throttle valve in which a throttle valve 38a and a check valve 38b are formed integrally, and as shown in FIG. 1, the throttle valve 38a and the check valve 38b are arranged in parallel. As shown in FIG. 4, the second throttle valve 38 includes a tubular flow path member 50, a rod-shaped member 58 arranged on an inner circumferential part of the flow path member 50, a knob portion 59 joined to an end part of the rod-shaped member 58, and a backflow prevention sealing member 56 mounted on an outer circumferential part of the flow path member 50. The flow path member 50 is fitted into the inlet side of the valve hole 39, is smaller in diameter at the rear side part thereof than the inlet side part thereof, and divides the valve hole 39 into an inner side flow path 52b on an inner circumferential side of the flow path member 50, and an outer side flow path 54a on an outer side of the flow path member 50. The inner side flow path 52b has an end part which opens toward an inner side of the valve hole 39, and includes, on the side part thereof, an opening 52a which communicates with the first hole portion 42a. The outer side flow path 54a is formed as a gap between an outer circumference of the flow path member 50 and the valve hole 39. Air from the first hole portion 42a is capable of flowing through two flow paths, i.e., the inner side flow path 52b and the outer side flow path 54a.

The rod-shaped member 58 of the second throttle valve 38 is arranged so as to be capable of advancing and retracting inside the inner side flow path 52b, via a screw mechanism 58a. Together with the knob portion 59, the rod-shaped member 58 can be rotated, and by rotating the knob portion 59, the cross-sectional area of the inner side flow path 52b is variably adjusted, thereby constituting the throttle valve 38a.

Further, the backflow prevention sealing member 56 is disposed in the outer side flow path 54a. The backflow prevention sealing member 56 is an annular sealing member that is mounted on the outer circumference of the flow path member 50, and is formed with a substantially V-shaped cross section having a concave portion formed on a rear side thereof. The backflow prevention sealing member 56 is elastically deformed such that the outer circumferential portion thereof is reduced in diameter to allow air flowing from the first hole portion 42a toward the inner side of the valve hole 39 to pass in a free flowing manner. Further, for the air flowing from the inner side of the valve hole 39 toward the first hole portion 42a, the outer circumferential portion of the backflow prevention sealing member 56 comes into close contact with the inner circumferential surface of the valve hole 39 to prevent the passage of the air through the outer side flow path 54a. Therefore, the air flowing from the inner side of the valve hole 39 toward the first hole portion 42a is capable of passing only through the inner side flow path 52b, and the air flows at a flow rate that is regulated by the rod-shaped member 58.

The pilot check valve 48 is provided on the rear surface 30e side of the valve hole 39. The pilot check valve 48 is disposed in a through hole 60 that penetrates from the first side surface 30c to the second side surface 30d. The through hole 60 is closed by a cap 64 on the first side surface 30c side, and is closed by a cap 62 on the second side surface 30d side. A piston chamber 60a, an intermediate portion 60b, and a check valve accommodating portion 60c are formed on the inner side of the cap 62 and the cap 64. The piston chamber 60a is a vacant chamber having a circular cross section, and the pilot air flow path 46 opens in the form of a pilot port 48c in the vicinity of the cap 64. Further, an air vent hole 65, which is opened to the atmosphere, opens in the vicinity of an end part of the piston chamber 60a on the intermediate portion 60b side. Furthermore, the intermediate portion 60b, which is formed with an inner diameter smaller than that of the piston chamber 60a, is formed on the second side surface 30d side of the piston chamber 60a.

A pilot piston 66, which is displaced in the axial direction of the through hole 60 according to the pressure of the pilot air, is arranged in the piston chamber 60a and the intermediate portion 60b. The pilot piston 66 includes a piston portion 66a that slides in the piston chamber 60a, a guide portion 66b that extends from the piston portion 66a toward the intermediate portion 60b, and a rod portion 66c that projects toward a distal end side (the second side surface 30*d* side) of the guide portion 66*b*. The piston portion 66*a* partitions the piston chamber 60*a* into a region that communicates with the pilot air flow path 46, and a region that communicates with the air vent hole 65. A return spring 68 is arranged in the piston chamber 60*a* on the intermediate portion 60*b* side of the piston portion 66*a*, and in the case that the pilot air is not acting, the pilot piston 66 is biased toward the cap 64 side by the elastic force of the return spring 68.

The guide portion 66*b* is formed with an inner diameter that allows the guide portion 66*b* to be inserted into the intermediate portion 60*b*, and is configured to slide while being guided by the intermediate portion 60*b*. The rod portion 66*c* projects from a distal end of the guide portion 66*b*. The rod portion 66*c* is formed with an outer diameter that is smaller than an inner diameter of the intermediate portion 60*b*, and forms a flow path through which air can pass, between the rod portion 66*c* and an inner circumferential surface of the intermediate portion 60*b*. A reduced diameter portion 60*d*, which is formed by reducing the inner diameter of the intermediate portion 60*b*, is formed on an end part of the intermediate portion 60*b* on the second side surface 30*d* side. The above-described rod portion 66*c* is formed with a diameter that is smaller than an inner diameter of the reduced diameter portion 60*d*, and the rod portion 66*c* is therefore capable of projecting toward the check valve accommodating portion 60*c* side. Further, the rod portion 66*c* is arranged so that a distal end portion thereof abuts against a later-described valve element 70 in the check valve accommodating portion 60*c*.

The check valve accommodating portion 60*c* is formed on the second side surface 30*d* side of the intermediate portion 60*b*. The check valve accommodating portion 60*c* is a vacant chamber having a circular cross section and formed with an inner diameter greater than that of the intermediate portion 60*b*, and the valve element 70 that constitutes the check valve is arranged in the interior thereof. The valve element 70 includes a disk-shaped closing portion 70*a* formed with a diameter capable of closing the reduced diameter portion 60*d* of the intermediate portion 60*b*, and a shaft portion 70*b* projecting from the closing portion 70*a* toward the cap 62 side. The closing portion 70*a* is covered with an elastic member that is superior in terms of its adhesive property. The shaft portion 70*b* is inserted into a tubular receiving portion 62*a* provided so as to project from the cap 62, and the valve element 70 is supported by the cap 62 so as to be capable of being displaced in the axial direction of the through hole 60. Further, a return spring 72 is disposed between the valve element 70 and the cap 62, and the valve element 70 is biased toward the reduced diameter portion 60*d* by the elastic force of the return spring 72. The second flow path 44 opens in the form of an outlet 48*b* on a side part of the check valve accommodating portion 60*c*. The second flow path 44 extends toward the front surface 30*a*, and communicates with a port forming hole 32*a* of the cylinder side port 32.

Figure 5:
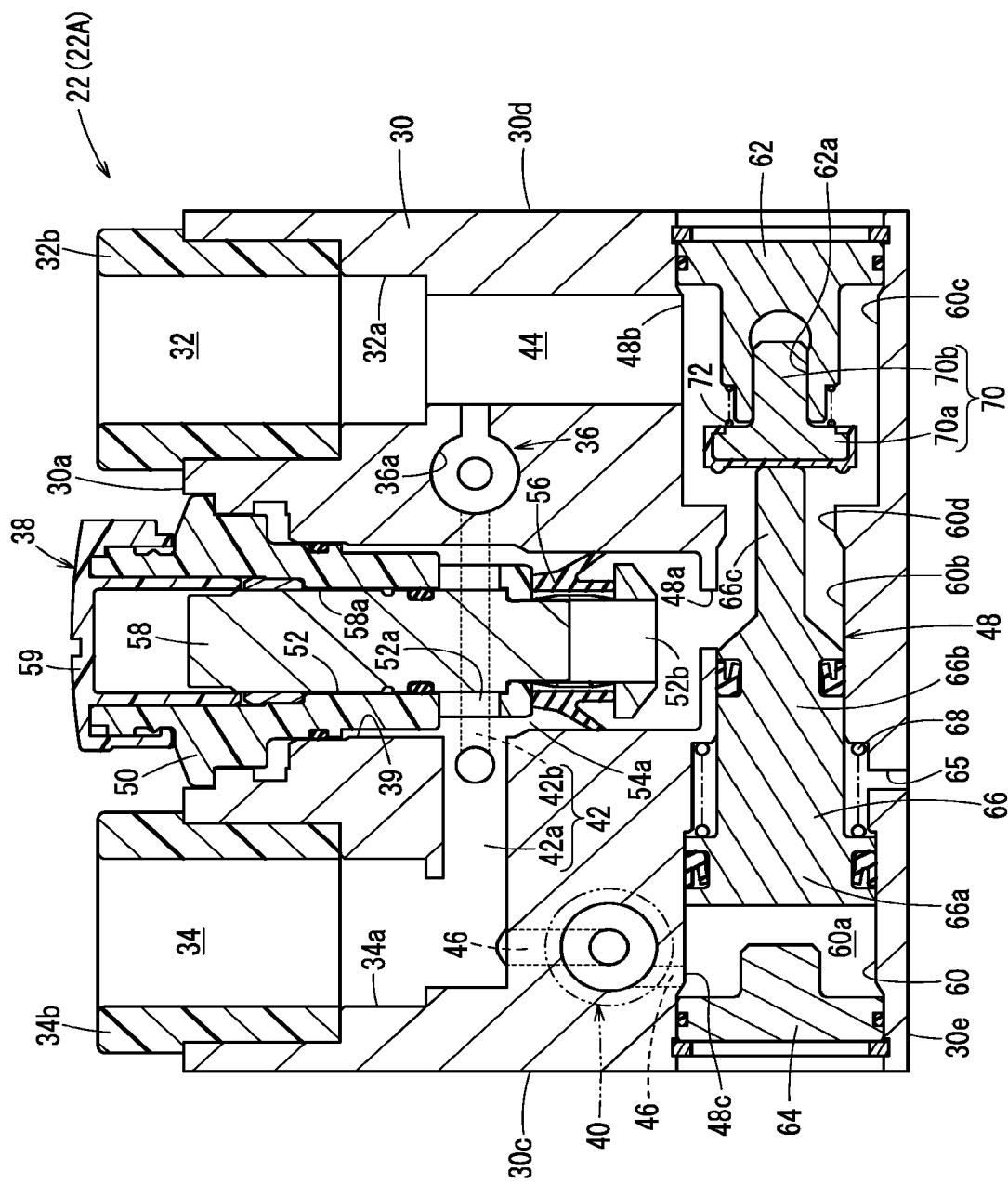
FIG. 5 is a cross-sectional view showing a state in which a pilot check valve shown in FIG. 4 is switched to a state in which air is capable of passing in both directions.

When the air attempts to flow in a reverse direction from the outlet 48*b* toward the inlet 48*a*, the valve element 70 is biased due to the pressure of the air so as to close the reduced diameter portion 60*d*, and prevents the air from flowing in reverse. However, as shown in FIG. 5, in the case that the rod portion 66*c* of the pilot piston 66 projects into the check valve accommodating portion 60*c* due to the pressure of the pilot air, the valve element 70 is maintained in a state of being separated away from the reduced diameter portion 60*d*, and allows passage of the air that flows in the reverse direction from the outlet 48*b* toward the inlet 48*a*.

Figure 6:
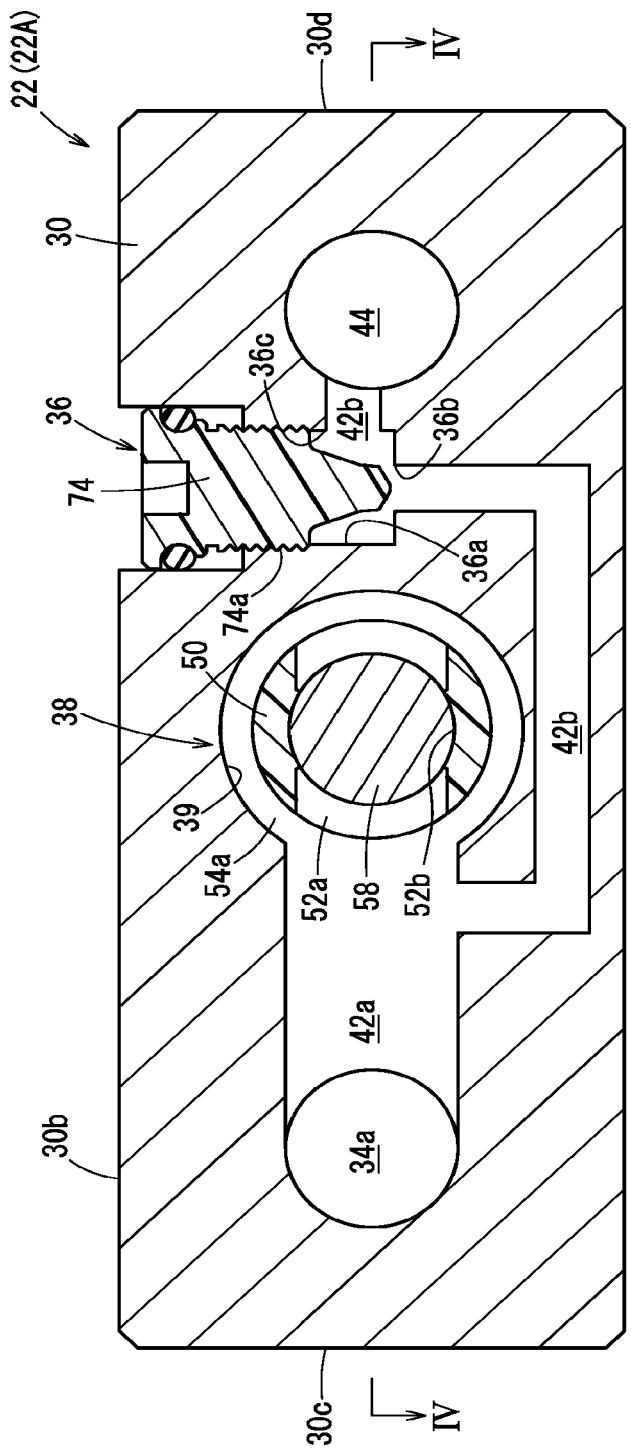
FIG. 6 is a cross-sectional view taken along line VI-VI of FIG. 3.

Meanwhile, as shown in FIG. 6, the second hole portion 42*b* of the first flow path 42 extends toward the second side surface 30*d* side in a bypassing manner around the valve hole 39 of the second throttle valve 38, and after passing through the first throttle valve 36, merges with a portion of the first flow path 42 in the vicinity of the cylinder side port 32. The first throttle valve 36 is disposed in a valve hole 36*a* which is formed from the upper surface 30*b* side. The second hole portion 42*b* opens in the form of an inlet 36*b* of the first throttle valve 36 on a lower end part of the valve hole 36*a*, and the second hole portion 42*b* opens in the form of an outlet 36*c* on a side part of the valve hole 36*a*. The first throttle valve 36 is equipped with a needle 74 that is fixed in the valve hole 36*a* by a screw mechanism 74*a*, and when the needle 74 is rotated and the needle 74 is made to advance toward the inlet 36*b* side, the cross-sectional area of the flow path of the second hole portion 42*b* is reduced. In this manner, the first throttle valve 36 is capable of variably adjusting a flow rate of the first flow path 42.

Figure 7:
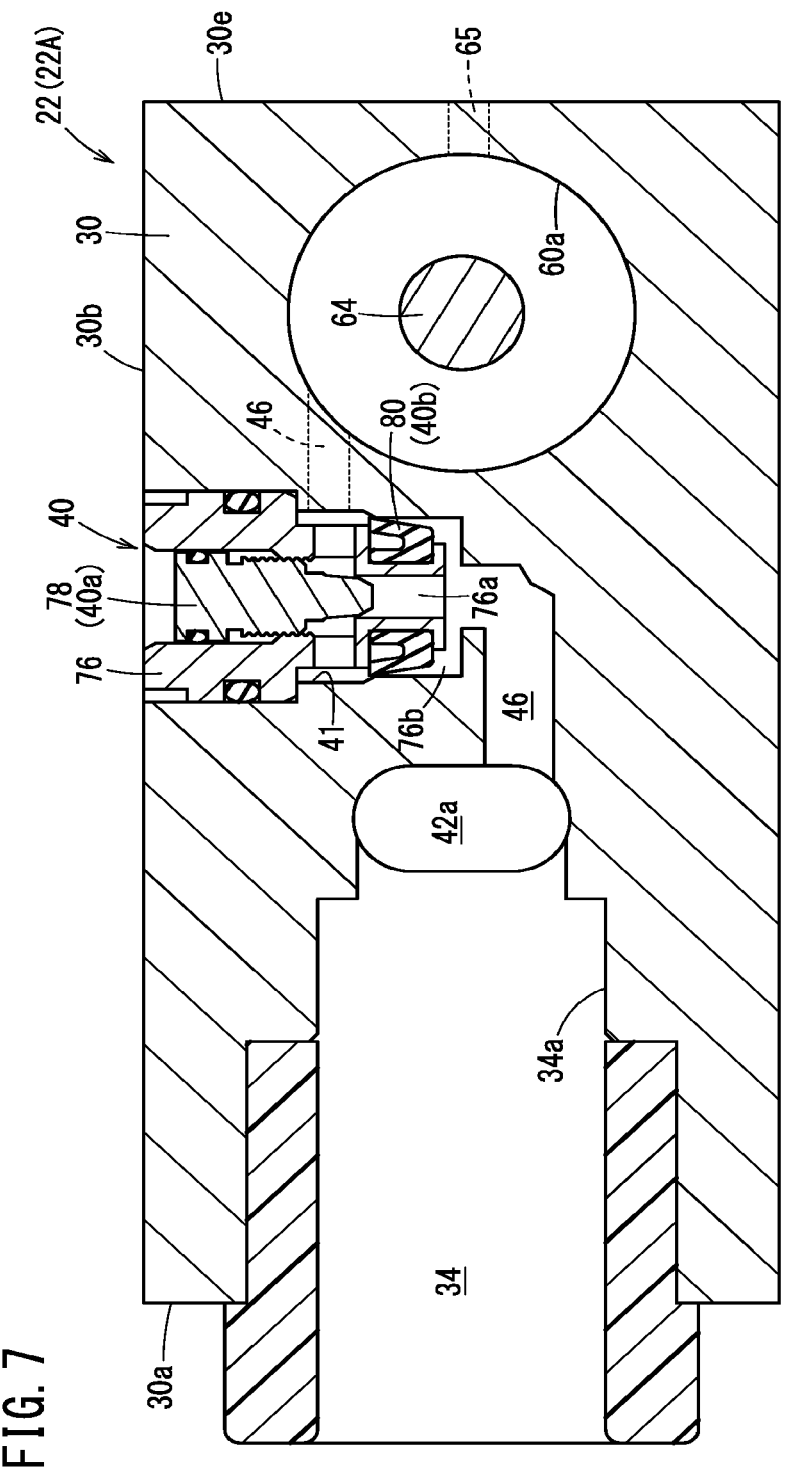
FIG. 7 is a cross-sectional view taken along line VII-VII of FIG. 3.

As shown in FIG. 7, the third throttle valve 40 is disposed in a valve hole 41 provided midway along the pilot air flow path 46. The valve hole 41 is formed from the upper surface 30*b* side, and the pilot air flow path 46 opens on a bottom part and a side part of the valve hole 41. The third throttle valve 40 is a check valve equipped throttle valve in which a throttle valve 40*a* and a check valve 40*b* are formed integrally, and includes a flow path member 76, a needle 78, and a backflow prevention sealing member 80.

The flow path member 76 is a tubular member that seals an upper end of the valve hole 41, and partitions a bottom side of the valve hole 41 into an inner side flow path 76*a* and an outer side flow path 76*b*. The needle 78 is inserted into the flow path member 76, and variably adjusts the cross-sectional area of the inner side flow path 76*a*. The backflow prevention sealing member 80 (check valve 40*b*) is made from an annular elastic member that is mounted on an outer circumferential portion of the flow path member 76. The backflow prevention sealing member 80 is formed with a substantially V-shaped cross section having a concave portion on the upper surface 30*b* side, and allows the pilot air to pass in a free flowing manner toward the pilot port 48*c*, while preventing passage of the air in an opposite direction. Accordingly, in the third throttle valve 40, the pilot air that is discharged from the pilot port 48*c* is throttled by the throttle valve 40*a*.

The connected relationship of the members constituting the head side flow rate controller 22 is shown in FIG. 1.

On the other hand, in FIG. 1, the rod side flow rate controller 22A, which is connected to the rod side port 18A, is configured in substantially the same manner as the head side flow rate controller 22. In the flow rate controller 22A, the same constituent elements as those of the head side flow rate controller 22 are designated by the same reference numerals, and detailed description thereof will be omitted.

Next, a description will be given concerning the configuration of the operation switching valve 28 that is connected to the head side flow rate controller 22 and the rod side flow rate controller 22A. The operation switching valve 28 is a 5-port valve that electrically switches a connection destination of the high pressure air, and includes first through fifth ports 28*a* to 28*e*. The first port 28*a* is connected to the valve side port 34 of the head side flow rate controller 22, and the second port 28*b* is connected to the valve side port 34 of the rod side flow rate controller 22A. The third port 28*c* and the fifth port 28e are connected to the exhaust ports 26, and the fourth port 28d is connected to the high pressure air supply source 24.

At a first position shown in FIG. 1, the operation switching valve 28 allows the first port 28a and the fourth port 28d to communicate with each other, and allows the second port 28b and the fifth port 28e to communicate with each other. In this manner, the operation switching valve 28 supplies the high pressure air from the high pressure air supply source 24 to the head side flow rate controller 22, and discharges the exhaust air of the rod side pressure chamber 12b from the exhaust port 26.

Further, at a second position, the operation switching valve 28 allows the first port 28a and the third port 28c to communicate with each other, and allows the second port 28b and the fourth port 28d to communicate with each other. In this manner, the operation switching valve 28 supplies the high pressure air from the high pressure air supply source 24 to the rod side flow rate controller 22A, and discharges the exhaust air of the head side pressure chamber 12a from the exhaust port 26.

The flow rate controllers 22 and 22A and the drive device 20 of the present embodiment are configured in the manner described above. Next, actions thereof will be described below together with their operations. In this instance, with reference to FIGS. 1 and 8, a description will be given as an example of an operating stroke for moving the piston 14 toward the rod side port 18A.

As shown in FIG. 1, in the operating stroke, the operation switching valve 28 is switched to the first position, and the high pressure air supply source 24 is connected to the head side flow rate controller 22. The high pressure air flows into the flow rate controller 22 through the valve side port 34, and flows into the first flow path 42, the second flow path 44, and the pilot air flow path 46. As shown by the arrow A, the high pressure air primarily passes through the check valve 38b and the pilot check valve 48 of the second flow path 44, and is supplied in a free flowing manner to the head side port 18 of the air cylinder 10. Further, the high pressure air which has flowed into the pilot air flow path 46 flows as pilot air in a forward direction through the check valve 40b, and is stored in the piston chamber 60a (see FIG. 5) of the pilot check valve 48.

On the other hand, the exhaust air discharged from the rod side pressure chamber 12b flows from the cylinder side port 32 into the rod side flow rate controller 22A. The pilot air that was stored during the previous stroke remains in the piston chamber 60a of the pilot check valve 48 of the flow rate controller 22A, and as shown in FIG. 5, the pilot piston 66 projects toward the check valve accommodating portion 60c side. Therefore, as shown in FIG. 1, the pilot check valve 48 allows the exhaust air to pass from the outlet 48b toward the inlet 48a.

Accordingly, the exhaust air flows through the first flow path 42 as shown by the arrow B1, and also flows through the second flow path 44 as shown by the arrow B2. The exhaust air is throttled by the first throttle valve 36 of the first flow path 42, as well as by the second throttle valve 38, and as shown by the arrow B1+B2, passes through the operation switching valve 28 and is discharged from the exhaust port 26. The operating speed of the piston 14 of the air cylinder 10 is determined by the flow rate of the exhaust air of the rod side flow rate controller 22A.

Further, while the piston 14 carries out the operating stroke, the pilot air of the rod side pilot check valve 48 is gradually discharged through the pilot air flow path 46 and the third throttle valve 40. Along therewith, the pressure of the pilot air of the pilot check valve 48 gradually decreases.

When the pressure of the rod side pilot check valve 48 falls below a predetermined value, the pilot piston 66 is displaced toward the cap 64 side by the elastic force of the return spring 68, and the rod portion 66c is pulled inward toward the intermediate portion 60b side as shown in FIG. 4. As a result, the valve element 70 of the check valve accommodating portion 60c closes the reduced diameter portion 60d, and the pilot check valve 48 switches to a state preventing passage of the exhaust air.

Figure 8:
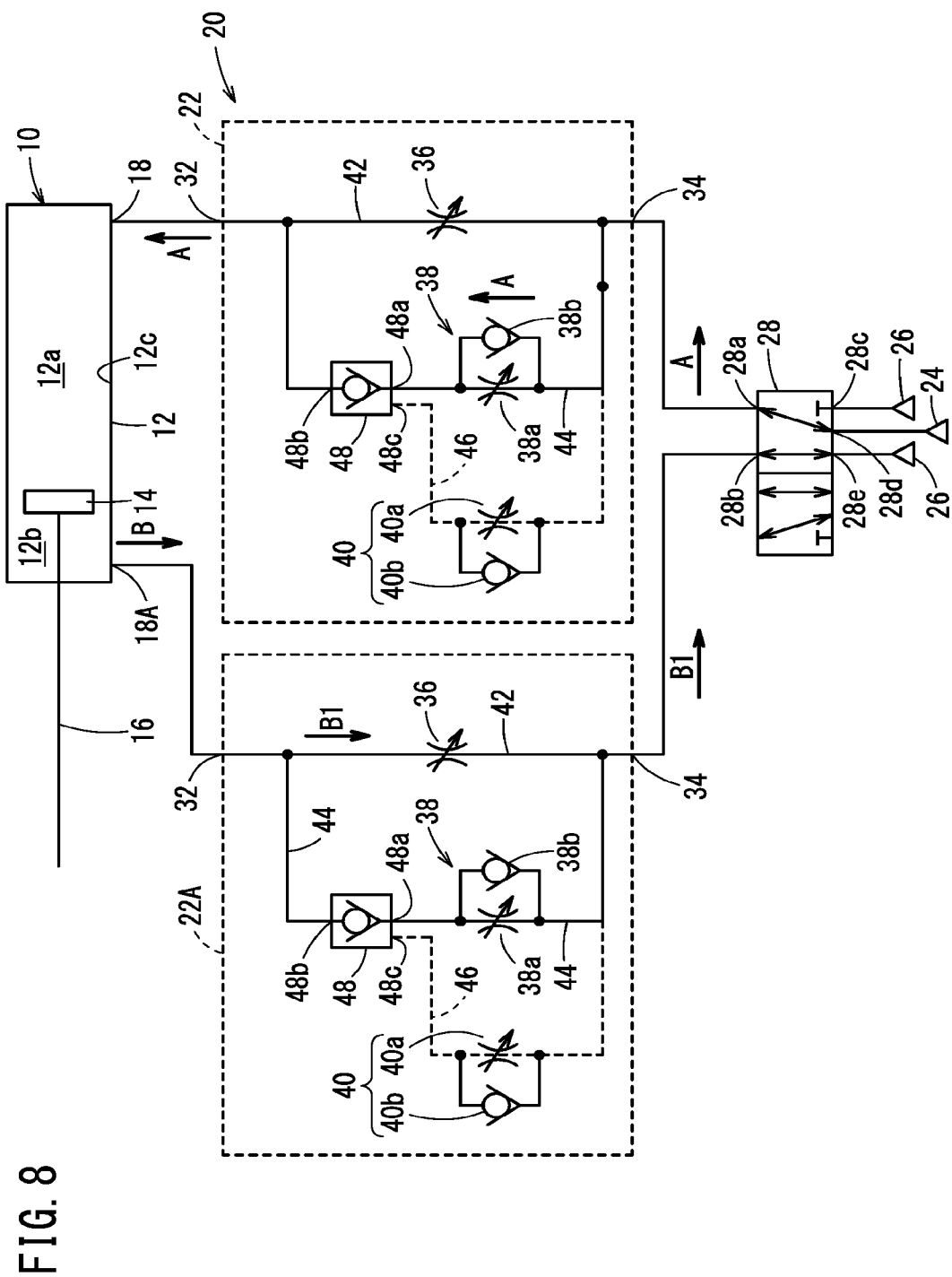
FIG. 8 is a fluid circuit diagram showing the flow of air when a rod side flow rate controller shown in FIG. 1 is switched to a second control flow.

In addition, as shown by the arrow B1 in FIG. 8, the exhaust air passes only through the first flow path 42. The flow rate of the exhaust air is throttled by the first throttle valve 36, whereby the operating speed of the piston 14 decreases. Consequently, shocks in the air cylinder 10 when the piston 14 reaches the stroke end are mitigated.

In accordance with the foregoing, the stroke operation by the drive device 20 of the air cylinder 10 comes to an end. Thereafter, by the operation switching valve 28 being switched to the second position, the return stroke is carried out. In the return stroke, the exhaust air flows to the head side flow rate controller 22, and the high pressure air flows to the rod side flow rate controller 22A. The operations of the drive device 20 in the return stroke simply involve a switching of places in the operating stroke between the head side flow rate controller 22 and the rod side flow rate controller 22A, and since the operations in the return stroke and the operations in the operating stroke are basically the same, a description of such operations will be omitted.

The flow rate controllers 22 and 22A and the drive device 20 of the present embodiment realize the following advantageous effects.

The flow rate controller 22 or 22A, which is connected between a port of the air cylinder 10 and the operation switching valve 28 that switches and thereby connects the high pressure air supply source 24 or the exhaust port 26 to the air cylinder 10, comprises the housing 30 including the cylinder side port 32 connected to the port of the air cylinder 10 and the valve side port 34 connected to the operation switching valve 28, the first flow path 42 provided inside the housing 30, and connecting the cylinder side port 32 and the valve side port 34, the first throttle valve 36 disposed in the first flow path 42, the second flow path 44 provided inside the housing 30 and disposed in parallel with the first flow path 42, the second throttle valve 38 disposed in the second flow path 44, the pilot check valve 48 disposed in the second flow path 44 and connected in series with the second throttle valve 38, the pilot air flow path 46 provided inside the housing 30, and connecting the valve side port 34 and the pilot port 48c of the pilot check valve 48 to supply and discharge the pilot air to and from the pilot check valve 48, and the third throttle valve 40 disposed in the pilot air flow path 46, wherein, depending on the pressure of the pilot air, the pilot check valve 48 switches between a state allowing passage of the exhaust air discharged from the air cylinder 10, and a state preventing the passage of the exhaust air.

According to the above-described configuration, since the pilot check valve 48, which is of a simple structure, is used in order to switch the control flow of the exhaust air, a switching valve in which a shuttle valve or a three-way valve is used becomes unnecessary, and the internal structure is simplified. Further, since constituent members, for which precision is required, such as sleeves and spools that constitute a shuttle valve or a three-way valve are rendered unnecessary, grinding or polishing and surface treatment requiring a number of production steps are rendered unnecessary, and manufacturing can be carried out at a low cost.

In the above-described flow rate controller 22 or 22A, there may further be provided the check valve 38b which is disposed in the second throttle valve 38, and allows passage of the air flowing from the valve side port 34 toward the cylinder side port 32. By providing the check valve 38b, the high pressure air can be supplied to the air cylinder 10 in a free flowing manner through the check valve 38b, and the air cylinder 10 becomes capable of being operated at a high speed.

In the above-described flow rate controller 22 or 22A, the third throttle valve 40 may be equipped with the throttle valve 40a, and the check valve 40b which is disposed in parallel with the throttle valve 40a, and allows passage of the air flowing toward the pilot port 48c. In accordance with such a configuration, with a simple device configuration, it is possible to adjust the timing at which the pilot check valve 48 is switched.

In the above-described flow rate controller 22 or 22A, the pilot check valve 48 includes the through hole 60 including the piston chamber 60a communicating with the pilot port 48c, the check valve accommodating portion 60c communicating with the cylinder side port 32, and the intermediate portion 60b connecting the piston chamber 60a and the check valve accommodating portion 60c, and communicating with the second throttle valve 38, the pilot piston 66 which is disposed in the piston chamber 60a and the intermediate portion 60b, and projects toward the check valve accommodating portion 60c or retracts away from the check valve accommodating portion 60c toward a side of the intermediate portion 60b, based on the pressure of the pilot air, and the valve element 70 disposed in the check valve accommodating portion 60c, and arranged so as to be capable of closing a connecting portion between the intermediate portion 60b and the check valve accommodating portion 60c, wherein, in a state in which the pilot piston 66 has retracted toward the side of the intermediate portion 60b, the valve element 70 allows passage of the high pressure air in a direction from the valve side port 34 to the cylinder side port 32, and prevents passage of the exhaust air in a direction opposite thereto, whereas in a state in which the pilot piston 66 projects toward a side of the check valve accommodating portion 60c, the valve element 70 allows passage of the high pressure air and the exhaust air.

In accordance with the above-described configuration, since the flow rate controllers 22 and 22A that carry out switching of the flow paths can be realized without the need for component parts that require a large number of production steps, such as a spool or the like on which grinding or polishing or surface treatment is carried out, the manufacturing cost of the flow rate controllers 22 and 22A can be suppressed.

In the above-described flow rate controller 22 or 22A, in the pilot check valve 48, when the pressure of the pilot air becomes greater than or equal to a predetermined value, the pilot piston 66 may project toward the side of the check valve accommodating portion 60c to allow the passage of the high pressure air and the exhaust air. In accordance with such a configuration, the high pressure air can be supplied to the air cylinder 10 in a free flowing manner through the second flow path 44, and the air cylinder 10 can be operated at a high speed.

Further, the drive device 20 of the present embodiment is the drive device 20 for the air cylinder 10, the drive device comprising the high pressure air supply source 24 that supplies the high pressure air to the air cylinder 10, the exhaust port 26 through which the exhaust air of the air cylinder 10 is discharged, the operation switching valve 28 that switches and thereby connects the high pressure air supply source 24 or the exhaust port 26 to a port of the air cylinder 10, and the flow rate controller 22 or 22A connected between the operation switching valve 28 and the port of the air cylinder 10, wherein the flow rate controller 22 or 22A includes the housing 30 including the cylinder side port 32 connected to the port of the air cylinder 10 and the valve side port 34 connected to the operation switching valve 28, the first flow path 42 provided inside the housing 30, and connecting the cylinder side port 32 and the valve side port 34, the first throttle valve 36 disposed in the first flow path 42, the second flow path 44 provided inside the housing 30 and disposed in parallel with the first flow path 42, the second throttle valve 38 disposed in the second flow path 44, the pilot check valve 48 disposed in the second flow path 44 and connected in series with the second throttle valve 38, the pilot air flow path 46 provided inside the housing 30, and connecting the valve side port 34 and the pilot port 48c of the pilot check valve 48 to supply and discharge the pilot air to and from the pilot check valve 48, and the third throttle valve 40 disposed in the pilot air flow path 46, wherein, depending on the pressure of the pilot air, the pilot check valve 48 switches between a state allowing passage of the exhaust air, and a state preventing the passage of the exhaust air.

Although a description of a preferred embodiment of the present invention has been presented above, it should be understood that the present invention is not limited to the above-described embodiment, but various changes and modifications may be made within a range that does not deviate from the essence and gist of the present invention.

The invention claimed is:

1. A flow rate controller connected between a port of an air cylinder, and an operation switching valve configured to switch and thereby connect a high pressure air supply source or an exhaust port to the air cylinder, the flow rate controller comprising:
    a housing including a cylinder side port connected to a port of the air cylinder, and a valve side port connected to the operation switching valve;
    a first flow path provided inside the housing, and configured to connect the cylinder side port and the valve side port;
    a first throttle valve disposed in the first flow path;
    a second flow path provided inside the housing and disposed in parallel with the first flow path;
    a second throttle valve disposed in the second flow path;
    a pilot check valve disposed in the second flow path and connected in series with the second throttle valve;
    a pilot air flow path provided inside the housing, and configured to connect the valve side port and a pilot port of the pilot check valve to supply and discharge pilot air to and from the pilot check valve; and
    a third throttle valve disposed in the pilot air flow path,
    wherein, depending on a pressure of the pilot air, the pilot check valve switches between a state allowing passage of exhaust air discharged from the air cylinder, and a state preventing the passage of the exhaust air.

2. The flow rate controller according to claim 1, further comprising a check valve provided in the second throttle valve, and configured to allow passage of air flowing from the valve side port toward the cylinder side port.

3. The flow rate controller according to claim 1,
wherein the third throttle valve includes a throttle valve, and a check valve disposed in parallel with the throttle valve, and configured to allow passage of air flowing toward the pilot port.

4. The flow rate controller according to claim 1,
wherein the pilot check valve includes:
a through hole including a piston chamber configured to communicate with the pilot port, a check valve accommodating portion configured to communicate with the cylinder side port, and an intermediate portion configured to connect the piston chamber and the check valve accommodating portion, and communicate with the second throttle valve;
a pilot piston disposed in the piston chamber and the intermediate portion, and configured to project toward the check valve accommodating portion or to retract away from the check valve accommodating portion toward a side of the intermediate portion, based on the pressure of the pilot air; and
a valve element disposed in the check valve accommodating portion, and arranged in a manner to allow a connecting portion between the intermediate portion and the check valve accommodating portion to be closed, and
in a state in which the pilot piston has retracted toward the side of the intermediate portion, the valve element allows passage of high pressure air in a direction from the valve side port to the cylinder side port, and prevents passage of the exhaust air in a direction opposite thereto, whereas in a state in which the pilot piston projects toward a side of the check valve accommodating portion, the valve element allows passage of the high pressure air and the exhaust air.

5. The flow rate controller according to claim 4,
wherein, in the pilot check valve, when the pressure of the pilot air becomes greater than or equal to a predetermined value, the pilot piston projects toward the side of the check valve accommodating portion to allow the passage of the high pressure air and the exhaust air.

6. A drive device for an air cylinder, the drive device comprising:
a high pressure air supply source configured to supply high pressure air to the air cylinder;
an exhaust port configured to discharge exhaust air of the air cylinder;
an operation switching valve configured to switch and thereby connect the high pressure air supply source or the exhaust port to a port of the air cylinder; and
a flow rate controller connected between the operation switching valve and the port of the air cylinder,
wherein the flow rate controller includes:
a housing including a cylinder side port connected to the port of the air cylinder, and a valve side port connected to the operation switching valve;
a first flow path provided inside the housing, and configured to connect the cylinder side port and the valve side port;
a first throttle valve disposed in the first flow path;
a second flow path provided inside the housing and disposed in parallel with the first flow path;
a second throttle valve disposed in the second flow path;
a pilot check valve disposed in the second flow path and connected in series with the second throttle valve;
a pilot air flow path provided inside the housing, and configured to connect the valve side port and a pilot port of the pilot check valve to supply and discharge pilot air to and from the pilot check valve; and
a third throttle valve disposed in the pilot air flow path, and
depending on a pressure of the pilot air, the pilot check valve switches between a state allowing passage of the exhaust air, and a state preventing the passage of the exhaust air.

* * * * *